United States Patent Office 3,123,608
Patented Mar. 3, 1964

3,123,608
PROCESS FOR CHLORINATION OF SIDE CHAINS OF 2-METHYL PYRIDINES AND 2-METHYL QUINOLINES
Wilhelm Mathes and Hans Schüly, Ludwigshafen (Rhine), Germany, assignors to Dr. F. Raschig G.m.b.H., Chemische Fabrik, Ludwigshafen (Rhine), Germany
No Drawing. Filed Nov. 8, 1961, Ser. No. 150,885
Claims priority, application Germany Nov. 12, 1960
5 Claims. (Cl. 260—283)

The present invention relates to an improved process for the chlorination of the methyl group standing in 2 position in methyl pyridines and methyl quinolines.

Previously ω-monochloromethyl pyridines were primarily produced from pyridine carbinols by reaction with thionyl chloride or phosphorus chlorides.[1] In addition thereto, processes are known for the production of ω-monochloromethyl pyridine from amino methyl pyridines by reaction with nitrous acid in strong HCl [2] from 2-picoline-N-oxide by reaction with p-toluene sulfonyl chloride [3] and from ω-di- or trichloromethyl pyridine by reduction with tin.[4] ω-Dichloromethyl pyridine was previously only produced by reduction of ω-trichloromethyl pyridine with tin in hydrochloric acid solution.[4] Stepwise chlorination with elemental chlorine which in the aromatic series as in toluene leads to benzyl chloride, benzal chloride or benzo trichloride is not appropriate for chlorination of the 2-methyl group in compounds of the pyridine series as ω-trichloromethyl pyridine is obtained, exclusively, usually in very poor yields.[4]

According to the invention it was unexpectedly found that the 2-methyl group in compounds of the pyridine series can also be chlorinated stepwise with elemental chlorine to produce ω-mono-, ω-di- and ω-trichloromethyl pyridine if the following conditions are maintained:

(1) Maintenance of a reaction temperature between 40 and 80° C.
(2) Carrying out the reaction in an inert diluent.
(3) The presence of a hydrochloric acid binding agent.

The process according to the invention renders it possible to produce the ω-monochloromethyl pyridines, which are especially valuable for synthesis, in a single step from the simplest of starting materials. The ω-monochloromethyl pyridines previously could only be produced in multistep processes with high losses.

Investigations according to the invention have shown that the hydrochloride salts of 2-methyl pyridine can only be chlorinated with difficulty at temperatures between 40 and 80° C. However, hydrogen chloride is naturally formed during chlorination which immediately forms the hydrochloride from the basic starting material. As a consequence, the reaction comes to a standstill after a very short period so that only a low conversion is obtained. It was found possible to avoid this difficulty by binding all of the hydrogen chloride produced during the chlorination as it is produced which, for example, can be accomplished with alkali metal carbonates or bicarbonates. This renders it possible to chlorinate all of the starting material even at moderate temperatures. This is most important for the isolation of the chlorinated products as the yield of ω-monochloromethyl pyridine sinks sharply when unconverted starting material is still present, as salts are easily formed between the ω-monochloromethyl pyridines and the non-chlorinated starting materials which in part react further to produce high molecular weight substances. The maintenance of a moderate temperature during the reaction also hinders the production of such salts which easily form at higher temperatures in a neutral or alkaline medium. The presence of a diluent also hinders the reaction between the ω-chloromethyl pyridines with the starting materials. In addition, the presence of such a solvent facilitates withdrawal of the exothermic heat of reaction and permits thorough mixture of the reacting substances with the added hydrogen chloride binding substances.

Neutral reacting halogenated hydrocarbons, such as chloroform, carbon tetrachloride, trichloroethylene and the like, can, for example, be employed as the inert solvent diluents as they neither react with the chlorine or the ω-chloromethyl pyridines produced under the conditions employed.

Acid reacting solvents, such as acetic acid, as many investigations have shown, lead exclusively to the production of ω-trichloromethyl pyridines.[5] In inert solvents it is possible by varying the quantity of chlorine supplied either to produce ω-monochloromethyl pyridine preferentially or by supplying more chlorine preferentially to produce the ω-di- or ω-trichloromethyl derivatives.

The ω-monochloromethyl pyridines produced can be separated off by extracting the reaction solution with dilute acids, for example, 2 n HCl. In view of the different basicity of the chlorinated compounds, the ω-monochloromethyl pyridines go into the hydrochloric acid phase whereas the higher chlorinated compounds remain in the organic solvent phase. Contrary to the salts, such as the hydrochlorides, of the ω-chloromethyl compounds, the free bases produced according to the invention in some instances are not stable for very long. For example, the 2-picolyl chloride already exhibits decomposition phenomena (red discoloration) after only a few hours. It therefore is necessary that the processing of these compounds is effected as rapidly as possible and that the distillation is carried out under a good vacuum. Short path or film evaporators are especially suited for technical production. The decomposable bases therefor must be used immediately for further reactions or they should be stabilized by conversion into their salts such as the hydrochlorides.

The process according to the invention can be employed for chlorinating methyl groups which are in position 2 with respect to the nitrogen atom in the pyridine nucleus, such as in 2-picoline and 2-methyl quinoline (quinaldine).

The quantity of diluent solvent employed is such that a stirrable reaction mixture is maintained at the temperatures employed. The more solvent employed the slower the reaction and the greater the recovery cost for the solvent. The quantity of diluent solvent therefore should not be so great as to be uneconomical and, on the other hand, should be sufficient that the reaction mixture can be effectively stirred during the course of the reaction with the stirring mechanism available.

The following examples illustrate several embodiments of the process according to the invention.

*Example 1*

186.2 g. (2 mols) of pure picoline were dissolved in 1000 cc. of water free CCl₄ and 300 g. of water free soda admixed therewith. The mixture was heated with stirring ---
[1] K. Winterfeld, K. Flick; Arch. Pharmaz. Ber. dtsch. pharmaz. Ges. 289/61, 448 (1956) © 1958, 3305.
[2] J. Overhoff, J. Boeke, A. Gorter; Recueil Trav. chim. Pays-Bas 55, 293 (1936). © 1937, I, 353.
[3] E. Matsumura: J. Chem. Soc. (Japan) 74, 363 (1953). C.A. 48, 6442b (1954).
[4] D. L. Hammick: J. Chem. Soc. (London) 1923, 2882, © 1924, II, 1384; D. L. Hammick: J. Chem. Soc. (London) 1926, 1302, © 1926, II, 1859; P. Dyson, D. L. Hammick: J. Chem. Soc. (London) 1939, I, 781, © 1939, II, 1866; E. T. McBee, M. B. Hass, E. M. Hodnett: Ind. Eng. Chem. 39, 389 (1947), © 1947, 588; B. R. Brown, D. L. Hammick, B. H. Thewlis: J. Chem. Soc. (London), 1951, 1145, © 1952, 845; Ch. H. Brett, E. M. Hodnett: A.P. 2,679,453, © 1955, 4680.

[5] See footnote 4, col 1.

to 60° C. in a three necked flask provided with a reflux condenser and 4 mols of chlorine introduced over a period of six hours. During the chlorine addition, the temperature was maintained between 60 and 65° C. by cooling lightly. After the reaction mixture had cooled down the resulting thick orange yellow slurry was mixed with 1000 cc. of 2 n HCl while stirring. Thereafter the CCl$_4$ phase was separated off in a separatory funnel and extracted twice more with 200 cc. of 2 n HCl. The combined HCl solutions were neutralized with soda and extracted with benzene. After drying the extract, the benzene was distilled off and the residue then distilled under vacuum. 165.2 g. (=65% of the theoretical) of 2-picolyl chloride distilled over as a colorless distillate at 45–75° C. under a pressure of 1.5 mm. Hg. The melting point of its picrate was 147–148° C., $n_D^{20}$=1.5365.

The CCl$_4$ solution was neutralized by shaking with a soda solution, dried with Na$_2$SO$_4$, the solvent distilled off and the reaction distilled under vacuum. 22.5 g. of 2 dichloromethyl pyridine distilled over at 62–65° C. at a pressure of 1.2 mm. Hg (melting point of picrate 115–116° C., $n_D^{20}$=1.5470) and 4.5 g. of 2-trichloromethyl pyridine distilled over at 76–80° C. at a pressure of 1.2 mm. Hg (no picrate, $n_D^{20}$=1.5620).

The same results were obtained when the chloroform was replaced by trichloroethylene.

*Example 2*

214 g. (2 mols) of 2,6-lutidine were dissolved in 800 cc. of CCl$_4$ and 400 g. of soda added thereto. The mixture was heated with stirring to 60° C. and 4 mols of chlorine introduced over a period of 7 hours. The reaction mixture was processed as in Example 1. Upon distillation of the residue from the benzene solution 162.5 g. (57% of the theoretical) of 6-methyl-2-chloromethyl pyridine distilled over at 50–54° C. at a pressure of 1 mm. Hg (melting point of picrate 159–161° C., $n_D^{20}$=1.5315). The product was colorless when distilled but turned orange very soon thereafter. Upon longer standing it assumes a brownish black coloration. It is somewhat more stable than 2-chloromethyl pyridine.

*Example 3*

242 g. (2 mols) of 2,4,6-collidine were dissolved in 800 cc. of CCl$_4$ and 400 g. of soda added thereto. 4.5 mols of chlorine were introduced over an 8 hour period while maintaining a reaction temperature of 55° C. The reaction mixture was processed as in Example 1. Upon distillation of the residue from the benzene solution, 172 g. (55% of the theoretical) of colorless 4,6-dimethyl-2-chloromethyl pyridine distilled over at 68–70° C. under a pressure of 1.4 mm. Hg (melting point of picrate 125–126° C., $n_D^{20}$=1.5280). As the monochloro derivatives and the corresponding carbinols of 2,4,6-collidine were not previously known, the chloro derivative was hydrolysed to the carbinol with H$_2$SO$_4$ and this oxidized with NO$_3$ to the corresponding monocarboxylic acid. The resulting acid was found to be identical with 4,6-dimethyl-pyridine-carboxylic acid-(2) which proved that the monochloro product obtained was in fact 4,6-dimethyl-2-chloromethyl pyridine. Such product was more stable than the corresponding compounds of 2-picoline and 2,6-lutidine. It colored yellow upon standing but could be stored without noteworthy decomposition.

*Example 4*

286 g. (2 mols) of pure quinaldine were dissolved in 1000 cc. of CCl$_4$ and mixed with 300 g. of water free soda. 4 mols of chlorine were introduced over a period of 6 hours at 50° C. and the reaction mixture processed as previously described. After the extraction with 2 n HCl the HCl extract was neutralized with soda whereupon a precipitate of grayish color separated out which was filtered off after about one hour and washed with water. After drying, the precipitate was recrystallized from petroleum ether (B.P. 80–100° C.) with the addition of active carbon. 214 g. (60% of the theoretical) of 2-chloromethyl quinoline were obtained as colorless needles having a melting point of 56.5–57.5° C. The melting point of the picrate was 171–172° C. The compound was very stable and could be stored in brown bottles without undergoing substantial change. 42 g. of 2-dichloromethyl quinoline of a melting point of 82–83° C. could be recovered from the residue of the evaporated CCl$_4$ solution by recrystallization from petroleum ether. The melting point of its picrate was 118–119° C. The same results were obtained when the CCl$_4$ was replaced by chloroform.

*Example 5*

107 g. (1 mol) of 2,3-lutidine were dissolved in 800 cc. of CCl$_4$ and 200 g. of water free soda added thereto. 2 mols of chlorine were introduced over a period of three hours at 60–65° C. The reaction mixture was processed as described above but care was taken during the evaporation of the benzene solution by carrying out such evaporation under a light vacuum and that the residue was immediately distilled under a good vacuum. The 3-methyl-2-chloromethyl pyridine distilled over as a colorless liquid at 59–66° C. under a pressure of 1.4 mm. Hg but already discolored to a light red in the condenser. The yield was 90.5 g. (64% of the theoretical) $n_D^{20}$=1.5407, melting point of picrate 146–146.5° C., of hydrochloride 157° C.

We claim:
1. A process for the chlorination of a methyl group in 2-position in a compound selected from the group consisting of methyl homologues of pyridine and methyl homologues of quinoline carrying a methyl group in 2 position which comprises reacting such compound with elemental chlorine in an inert solvent in contact with an inorganic hydrogen chloride binding agent at a temperature between 40 and 80° C. until all of such starting compound is chlorinated.

2. The process of claim 1 comprising in addition extracting the resulting reaction mixture with a dilute acid to remove the monochloromethyl compound produced therefrom.

3. The process of claim 2 wherein said dilute acid is dilute hydrochloric acid.

4. The process of claim 1 in which said inorganic acid binding agent is a salt of a strong base with carbonic acid.

5. The process of claim 1 in which said inorganic acid binding agent is an alkali metal salt of carbonic acid.

References Cited in the file of this patent

Hammick: J. Chem. Soc. (London), 1923, pp. 2882–4.
Dyson et al.: J. Chem. Soc. (London), 1939, pp. 781–2.
Groggins: Unit Processes in Organic Synthesis, pp. 226–7 (1947).
Nagaoka: Yakugaku Zasshi, vol. 81, pp. 479–83 (1961).
Reinhardt et al.: Ber. d. Deut. Chem., vol. 90, pp. 2643–5.